Figures 1, 2, 3:
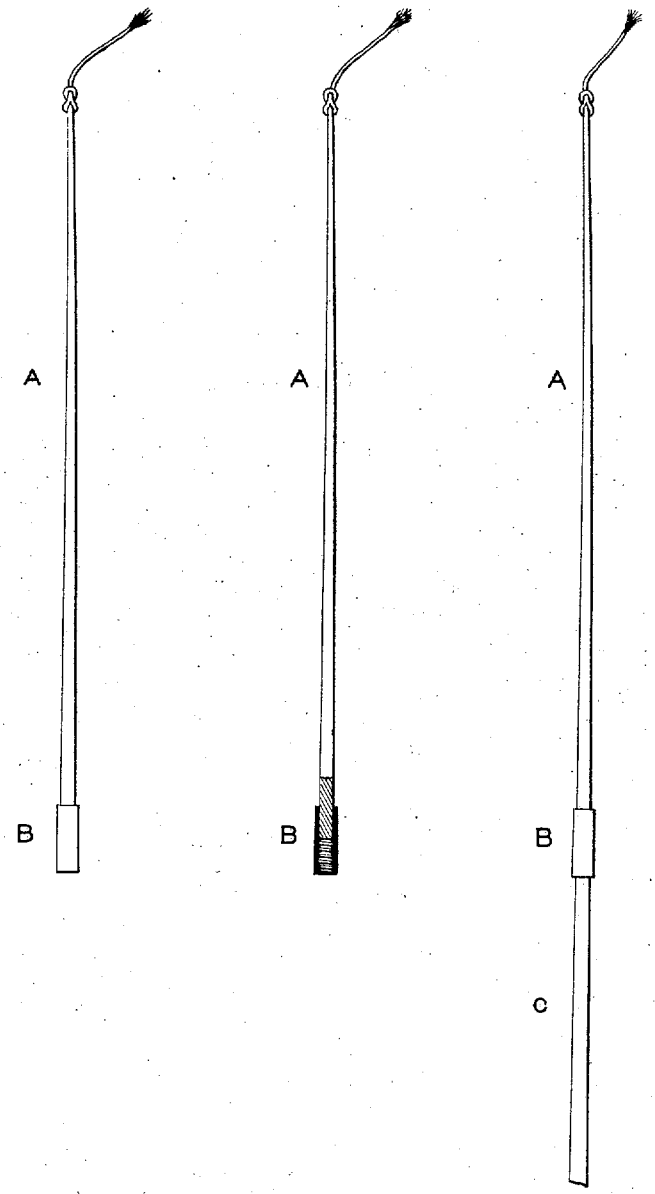

C. R. SHELTON.

Assignor by mesne Assignments to the American Whip Company.

WHIP-TIPS.

No. 7,382. Reissued Nov. 7, 1876.

WITNESSES.

A. H. Norris

Ira L. Boomer

Clark R. Shelton

By Boyd Eliot

Atty.

UNITED STATES PATENT OFFICE.

CLARK R. SHELTON, OF NEW HAVEN, CONNECTICUT, ASSIGNOR, BY MESNE ASSIGNMENTS, TO THE AMERICAN WHIP COMPANY.

IMPROVEMENT IN WHIP-TIPS.

Specification forming part of Letters Patent No. 74,435, dated February 11, 1868; reissue No. 7,382, dated November 7, 1876; application filed December 1, 1875.

*To all whom it may concern:*

Be it known that I, CLARK R. SHELTON, of New Haven, county of New Haven, and State of Connecticut, have invented certain Improvements in Whip-Tips, of which the following is a clear and distinct specification, reference being had to the accompanying drawings, in which—

Figure 1 is a side view of the tip; Fig. 2, the same, with the lower portion in section; and Fig. 3 shows the tip attached to the stock.

This invention pertains to that class of articles known as "driving-whips," and specially to that class which are of great length and without a lash. This class of whips is generally expensive, and, in use, are frequently broken or frayed out at the tip end, and, when so worn or broken, are injured to such an extent as to be practically worthless.

Various devices are resorted to to repair the whips so worn or broken, that generally practiced being to lap a tip onto the lower part or stock, and bind the two together by wrapping thread or cord around them. This not only injures the appearance of the whip so repaired, but makes a joint, which, in use, often works loose, and soon again renders the whip useless, while the lower portion remains in perfect condition. To overcome this difficulty the tip is made independent of the stock, so that the tip becomes an article of manufacture, and a person breaking the tip has only to remove it from the lower portion and replace it by a new one; and this invention consists in constructing the tip of a whip so as to be attached to the lower portion of the stock by providing the lower end of the tip with a socket, so as to be attached to the stock by inserting the one into the other and fastening them together.

One method of such construction is shown in the accompanying drawings, in which a tip is shown at A, and is made of any desirable length, and in the usual manner of making whips. At its large end is placed a socket, as at B, which consists of a cylinder fitting closely around it and secured to the tip, it extending about half-way through the cylinder. Within the cylinder, at its lower end, there is formed a screw-thread for holding the parts together, and thus constructed, the tip is complete as an article of manufacture, and ready to be attached to the lower portion of the stock of the whip whenever its tip may become worn or broken, and in this manner render the handle, which is the most costly portion of the whip, as useful as at first, and which will, with ordinary usage, outlast many tips.

Though I have described said invention as being chiefly applicable to the class of whips without a lash, it is equally adapted to all classes of driving-whips.

I therefore claim—

1. As a new article of manufacture, a whip-tip provided with a socket, so as to be attached to the stock proper, as and for the purposes set forth.

2. The combination of a whip-stock with a detachable tip, substantially as and for the purpose specified.

CLARK R. SHELTON.

Attest:
JOHN E. EARLE,
CLARA BROUGHTON.